(12) United States Patent
Charny et al.

(10) Patent No.: US 6,978,394 B1
(45) Date of Patent: Dec. 20, 2005

(54) LINEAR PROGRAM-BASED TECHNIQUE FOR PLACING FRR TE TUNNELS WITH BANDWIDTH GUARANTEE

(75) Inventors: Anna Charny, Sudbury, MA (US); Robert Goguen, Acton, MA (US); Carol Iturralde, Framingham, MA (US)

(73) Assignee: Cisco Technology, Inc., San Jose, CA (US)

(*) Notice: Subject to any disclaimer, the term of this patent is extended or adjusted under 35 U.S.C. 154(b) by 583 days.

(21) Appl. No.: 10/080,956

(22) Filed: Feb. 22, 2002

(51) Int. Cl.$^7$ ............................................. G06F 11/00
(52) U.S. Cl. ........................................ 714/4; 370/228
(58) Field of Search ...................... 714/4, 43; 370/228

(56) References Cited

U.S. PATENT DOCUMENTS

| | | | |
|---|---|---|---|
| 5,020,052 A | 5/1991 | Deprycker et al. | ............ 370/60 |
| 5,235,599 A * | 8/1993 | Nishimura et al. | ............. 714/4 |
| 6,147,966 A * | 11/2000 | Johnson et al. | ............. 370/221 |
| 6,377,543 B1 * | 4/2002 | Grover et al. | .............. 370/227 |
| 6,744,727 B2 * | 6/2004 | Liu et al. | .................... 370/228 |
| 2002/0097671 A1 * | 7/2002 | Doverspike et al. | ........ 370/216 |
| 2003/0048749 A1 * | 3/2003 | Stamatelakis et al. | ...... 370/225 |

OTHER PUBLICATIONS

R. Braden, et al. "Resource ReSerVation Protocol (RSVP)—Version 1 Functional Specification," RFC 2205, Internet Engineering Task Force, Sep. 1997.

D. Awduche, et al. "Requirements for Traffic Engineering Over MPLS," RFC 2702, Internet Engineering Task Force, Sep. 1999.

E. Rosen, et al. "Multiprotocol Label Switching Architecture," RFC 3031, Internet Engineering Task Force, Jan. 2001.

D. Gan, et al. "A Method for MPLS LSP Fast-Reroute Using RSVP Detours," Internet Draft, Internet Engineering Task Force, Apr. 2001.

J. P. Lang, et al. Generalized MPLS Recovery Mechanisms, Internet Draft, Internet Engineering Task Force, Jun. 2001.

P. Ashwood-Smith, et al. Generalized MPLS Signaling—RSVP-TE Extensions, Internet Draft, Internet Engineering Task Force, Oct. 2001.

Pan, et al. "Fast Reroute Techniques in RSVP-TE," Internet Draft, Internet Engineering Task Force, Nov. 2001.

F. LeFaucheur, et al. "Requirements for Support of Diff-Serv-aware MPLS Traffic Engineering," Internet Draft, Internet Engineering Task Force, Nov. 2001.

* cited by examiner

Primary Examiner—Bryce P. Bonzo
(74) Attorney, Agent, or Firm—Cindy Kaplan

(57) ABSTRACT

Load balancing enables the use of linear programming techniques to reduce the complexity of computing backup tunnel placement for guaranteed bandwidth protection. The ability to load balance among multiple backup tunnels transforms the placement problem into one that may be characterized as a series of linear constraints usable as input to a linear programming procedure such as the simplex method. Each node may compute its own backup tunnels and signal the tunnels to its neighbors with zero bandwidth to allow implicit sharing of backup bandwidth.

26 Claims, 5 Drawing Sheets

LINEAR PROGRAM-BASED TECHNIQUE FOR PLACING FRR TE TUNNELS WITH BANDWIDTH GUARANTEE

STATEMENT OF RELATED APPLICATIONS

The present application is related to the subject matter of U.S. patent application Ser. No. 10/038,259, entitled "Implicit Shared Bandwidth Protection for Fast Reroute", filed on Jan. 2, 2002, and also to the subject matter of U.S. patent application Ser. No. 10/052,665, entitled "Load Balancing for Fast Reroute Tunnels," filed on Jan. 17, 2002. The contents of both applications are herein incorporated by reference in their entirety.

BACKGROUND OF THE INVENTION

The present invention relates to data networking and more particularly to systems and methods for providing fault tolerance to data networks.

As the Internet becomes a multi-media communications medium that is expected to reliably handle voice and video traffic, network protocols must also evolve to support quality-of-service (QoS) requirements such as latency and reliability and to provide guaranteed available bandwidths. One form that this evolution is taking is the advent of MPLS (Multi-Protocol Label Switching) Traffic Engineering which may be supplemented by Diffserv-aware Traffic Engineering. Rather than using conventional IP routing techniques where individual packets travel through the network following paths determined individually for each packet as it progresses through the network, MPLS Traffic Engineering exploits modern label switching techniques to build guaranteed bandwidth end-to-end circuits through a network of label switched routers (LSRs). MPLS has been found to be highly useful in establishing such circuits also referred to as label switched paths (LSPs). MPLS networks employing LSPs can more easily interoperate with other IP-based networks than other virtual circuit-oriented networks employing, e.g., ATM or Frame Relay. Networks based on MPLS Traffic Engineering, especially those supplemented with DiffServ-aware Traffic Engineering are very effective in handling delay and jitter-sensitive applications such as voice over IP (VoIP) and real-time video.

Meeting the demands of businesses and consumers, however, also requires that bandwidth and latency guarantees continue to be met when links or nodes fail. When failure of a link or a node causes the failure of an LSP, the standard routing protocols such as constraint-based shortest path first (CSPF) are too slow to be used for dynamic rerouting of QoS-sensitive traffic. In optical networks employing SONET, fast restoration can be provided by means of features incorporated into the SONET protocol. However, where such techniques are not available, other protection mechanisms become necessary to ensure that services are restored within a sufficiently short time, e.g., 50 ms, such that the user experience is not affected.

To address this requirement, various fast reroute techniques have been developed that provide rapid reaction to failure of a link or node such that the user experience is preserved. In one approach, a so-called "primary" LSP is protected by a series of backup LSPs bypassing individual links and nodes traversed by the primary LSP. There is potentially a separate backup LSP bypassing a given link or node for each primary LSP traversing this given link or node. In an alternate approach, links and nodes are protected by local backup tunnels that are associated with the links and nodes themselves rather than the primary LSPs traversing the links and nodes. In this alternate approach, a single backup tunnel protecting a link or node can be used for backup of all primary LSPs protecting that link or node.

To protect a link, a backup tunnel is established connecting the two nodes that the protected link connects without including the protected link in the backup tunnel. To protect a node, a backup tunnel protects each pair of links traversing the node.

To guarantee quality of service under failure conditions, it is important that the backup tunnels have sufficient capacity to support all rerouted traffic in the event of a failure. The problem of placing backup tunnels while assuring that the backup tunnels have sufficient bandwidth to maintain quality of service can be reduced to the well known problem of placing LSPs with a given set of bandwidth requirements in a network with a given link capacity. This problem is frequently referred to as the QoS-routing problem. A standard solution is to use CSPF to place the backup tunnels (LSPs) one at a time, each time finding the shortest path where the remaining link capacity satisfies the bandwidth requirements of the backup tunnel being placed.

CSPF-based computation of the backup tunnel placement is quite computationally efficient. However, the algorithm may fail to find a placement for all of the needed backup tunnels even if a placement satisfying all of the capacity constraints exists.

This disadvantage of CSPF-based backup tunnel placement techniques has motivated development of more sophisticated methods for placing backup tunnels. These methods typically attempt to determine the placement of all needed backup tunnels simultaneously, rather than one at a time as in CSPF-based methods. Unfortunately the general problem of placing N backup tunnels satisfying capacity constraints is known to be NP-complete, i.e., not computationally efficient.

What is needed are systems and methods for placing backup tunnels for fast reroute protection which are more likely to find a backup tunnel placement satisfying capacity constraints than CSPF-based methods and are sufficiently efficient to be computed quickly in a dynamically changing environment.

SUMMARY OF THE INVENTION

By virtue of one embodiment of the present invention, load balancing enables the use of linear programming techniques to reduce the complexity of computing backup tunnel placement for guaranteed bandwidth protection. The ability to load balance among multiple backup tunnels transforms the placement problem into one that may be characterized as a series of linear constraints usable as input to a linear programming procedure such as the simplex method. Each node may compute its own backup tunnels and signal the tunnels to its neighbors with zero bandwidth to allow implicit sharing of backup bandwidth.

One aspect of the present invention provides a method for placing fast reroute backup tunnels between nodes of one or more pairs of nodes of a network to satisfy a requested total bandwidth for fast reroute backup tunnels between nodes of each said pair. The method includes: specifying a set of constraints on the backup tunnels and performing linear programming operations based on the set of constraints to find the backup tunnels, wherein the requested total bandwidth between nodes of each node pair may be divided among multiple backup tunnels.

Further understanding of the nature and advantages of the inventions herein may be realized by reference to the remaining portions of the specification and the attached drawings.

DESCRIPTION OF SPECIFIC EMBODIMENTS

MPLS Traffic Engineering Network Environment

Figure 2:
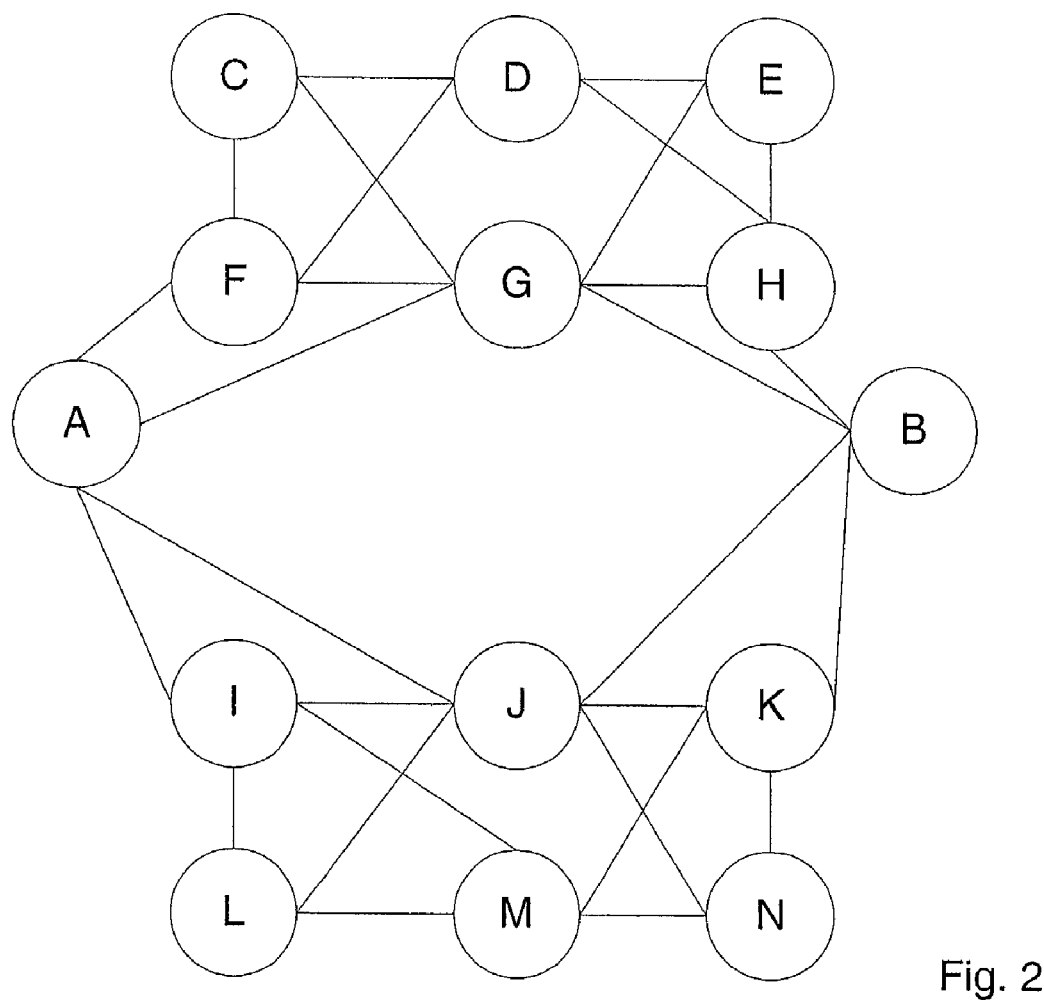
FIG. 2 depicts a network suitable for implementing one embodiment of the present invention.

The present invention will be described with reference to a representative network environment that employs a certain combination of network protocols to forward data through the network. FIG. 2 depicts a representative network 200 including nodes A through N. Interconnecting the nodes of network 200 are individual links xy where x identifies one endpoint of the link and y identifies the other one. The links may be implemented using any type of physical medium such as e.g., an optical medium, a wireless medium, twisted pair, etc.

In one embodiment, the nodes of network 200 interoperate in a manner specified by various protocols including, e.g., TCP/IP as known in the art, suitable link layer protocols such as Link Management Protocols (LMP), and protocols defined by the following documents:

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Ashwood-Smith, et al., "Generalized MPLS Signaling—RSVP-TE Extensions," Internet Draft, Internet Engineering Task Force, October 2001.

Le Faucheur, et al., "Requirements for Support of Diff-Serv-Aware MPLS Traffic Engineering," Internet Draft, Internet Engineering Task Force, November 2001.

Pan, et al., "Fast Reroute Techniques in RSVP-TE," Internet Draft, Internet Engineering Task Force, October 2001.

Awduche, et al., "RSVP-TE: Extensions to RSVP for LSP Tunnels," RFC 3209, Internet Engineering Task Force, December 2001

The contents of the above protocol documents are all herein incorporated by reference in their entirety for all purposes. Other suitable protocols as known in the art may also be implemented by nodes of network 200.

In one embodiment, the nodes of network 200 are IP routers that implement multiprotocol label switching (MPLS) and essentially operate as label switched routers (LSRs). At the ingress to network 200, a label is assigned to each incoming packet before forwarding the packet to the next hop node. At each intermediate node, a forwarding selection and a new substitute label are determined by using the label found in the incoming packet as a reference to a label forwarding table that includes this information. At the network egress (or one hop prior), a forwarding decision is made based on the incoming label but no label is included when the packet is sent on to the next hop.

It is desirable to provide end-to-end circuits across network 200 having guaranteed bandwidth, latency, jitter, etc. This is provided by employing MPLS Traffic Engineering (MPLS TE) and/or Diffserv-Aware Traffic Engineering. MPLS TE essentially builds and operates end-to-end circuits across LSRs by appropriately controlling the contents of the label forwarding tables at the various LSRs of network 200. Each end-to-end circuit is referred to as a Label Switched Path (LSP). Each LSP traverses a series of nodes and interconnecting links.

MPLS Traffic Engineering Fast Reroute

General MPLS TE fast reroute concepts will now be discussed to facilitate the discussion of systems and methods of the present invention. It is desirable that network 200 provide very high reliability to support Internet services such as voice telephony and video conferencing where such a level of reliability is both expected and necessary. Accordingly, it is desired that when a node or a link fails that all the LSPs employing that failed link or node are rerouted very quickly (e.g., under 50 ms) so that the user experience is not affected by the failure. When a given LSP in a network employing MPLS TE experiences a node failure, the head-end, i.e., the ingress, will establish a new LSP as a substitute. However, this process requires far longer than desirable. Accordingly, a local fast reroute capability is provided so that when a node or a link fails, an LSP is temporarily rerouted around the failed link or node while a new end-to-end LSP is being established at the head-end. Besides links and nodes, other examples of elements that may be protected by fast reroute in accordance with the present invention include, e.g., groups of links, an LSP or group of LSPs, or any group of links and/or nodes protected together by one or more backup tunnels.

A failure is detected, preferably within 10 ms. A link or node failure may be detected, e.g., at the link layer or by failure to receive an expected RSVP HELLO message (or by any other method). Once a failure of an element is detected, traffic from each primary LSP traversing the failed element is redirected to the backup tunnels pre-established to protect the failed element. At the node where the backup tunnel starts (called the head-end of the backup tunnel), packets traversing an impacted LSP have a second level label imposed on their label stacks. This second level label is the basis for forwarding decisions through the backup tunnel. At each successive node of the backup tunnel, the second level label is used to select a next hop and a substitute second level label. At the final node of the backup tunnel, or alternatively at the penultimate node of the backup tunnel, this second level label is popped off the packet label stack so that the packet thereafter follows the original path of the LSP.

The LSP head-ends of all affected primary LSPs are also notified of the failure so that the LSP that is now rerouted via the backup tunnel can be rerouted in a more optimal way. The details of the mechanics of patching in backup tunnels and reacting to the failure of protected elements are disclosed in the Internet Draft entitled "Fast Reroute Techniques in RSVP-TE." It should be noted that besides a link or node, according to one embodiment of the present invention, a protected element may be a group of links, an LSP, a group of LSPs, or any grouping of links and/or nodes protected together by one or more backup tunnels. On each link in the network, there is primary bandwidth allocated for use by primary LSPs. The concept of primary bandwidth is discussed in greater detail in the above-referenced application entitled "Implicit Shared Bandwidth Protection for Fast Reroute." In one embodiment of this invention, a primary pool includes the maximum amount of bandwidth that can be allocated to primary LSPs at any time. In another embodiment, the primary bandwidth may be the actual bandwidth currently used by primary LSPs (which may be smaller than the maximum bandwidth pool allocated for primary LSPs).

There is also a backup bandwidth pool allocated for use by backup tunnels. The backup bandwidth pool is always the maximum amount of bandwidth that is allocated for backup traffic, regardless of how much bandwidth is actually backed up on the link.

For implementations that employ MPLS-TE without DS-TE, the primary bandwidth pool includes bandwidth equivalent to a defined maximum reservable bandwidth for LSPs or, alternatively, bandwidth equivalent to the bandwidth actually used by LSPs. A backup bandwidth pool is established on each link and preferably contains a bandwidth equivalent to the link speed minus the maximum reservable bandwidth.

It is also possible to allow limited "overbooking" in the event of failure of an element protected by the link such that total bandwidth reservations on the link exceed link capacity and then rely on TCP operation to adjust in response to the shortfall. In this type of implementation, the backup bandwidth pool may exceed the link speed minus the maximum reservable bandwidth.

For implementations that employ DS-TE, the primary bandwidth can be, e.g., the maximum reservable bandwidth of a particular bandwidth "subpool" as this term is defined by the document cited above entitled "Requirements for Support of Diff-Serv-Aware MPLS Traffic Engineering." The backup bandwidth pool then, for example, includes a configurable fraction of the remaining bandwidth on the link.

Backup Tunnels For Node, Link and SRLG Protection

A backup tunnel protecting a directed link connects the two nodes that the protected link connects without including the protected link. To protect a bi-directional link, one or more of such backup tunnels should be established to protect each direction of the link. The backup tunnels protecting different directions of a bi-directional link do not necessarily have to traverse the same paths in the network. A node is protected by protecting each link pair that includes a link to the node and a link from the node. A backup tunnel protects such a link pair by connecting the two nodes connected to the protected node by the link pair and avoiding the protecting node.

Figure 3A:
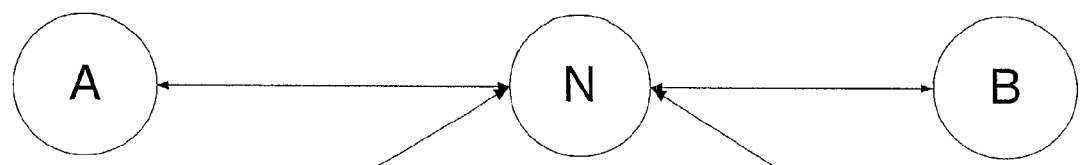
FIGS. 3A–3C depict bandwidth protection situations according to one embodiment of the present invention.
Figure 3B:
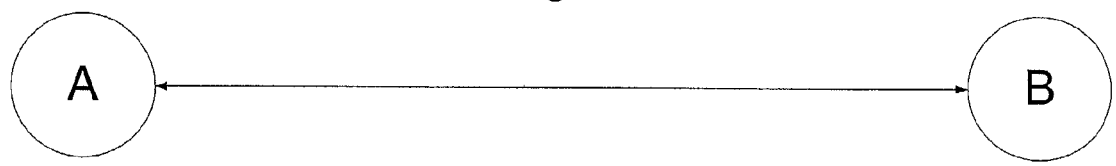
Figure 3C:
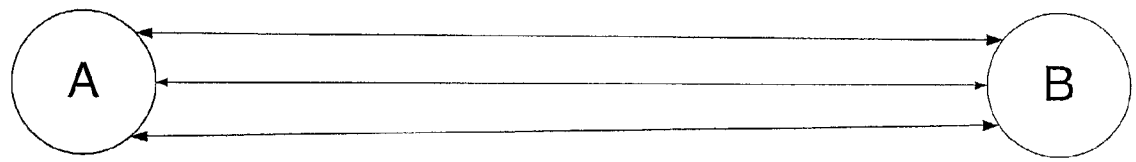

FIGS. 3A–3C depict various backup tunnel protection situations. In FIG. 3A, the traffic through node N is to be protected. This is done by protecting each link pair through node N. Here, this includes the pair of bi-directional links extending from node A to node B, the link pair extending from node A to node P, the link pair extending from node A to node O, and the pair of links extending from node O to node B, and O to P, and P to B. For each link pair, the primary bandwidth to be protected may be the actual combined bandwidth used by all primary LSPs established on the two depicted links. Alternatively, the primary bandwidth may be the minimum of the maximum bandwidths (bandwidth pools) that may be allocated to any primary LSPs on the two links. The first approach necessitates the recomputation of backup tunnels whenever a new LSP is established but is generally more bandwidth efficient than the alternative approach. The first approach is generally favored as long as the set of primary LSPs changes infrequently compared to the time needed to compute the backup paths.

In FIG. 3B, traffic flowing through the link between node A and node B are to be protected. In FIG. 3C, traffic flowing through parallel links between node A and node B is to be protected. The parallel links may constitute a so-called shared risk link group (SRLG) if they are expected to experience simultaneous failure because, e.g., they share a common fiber.

Figure 3D:
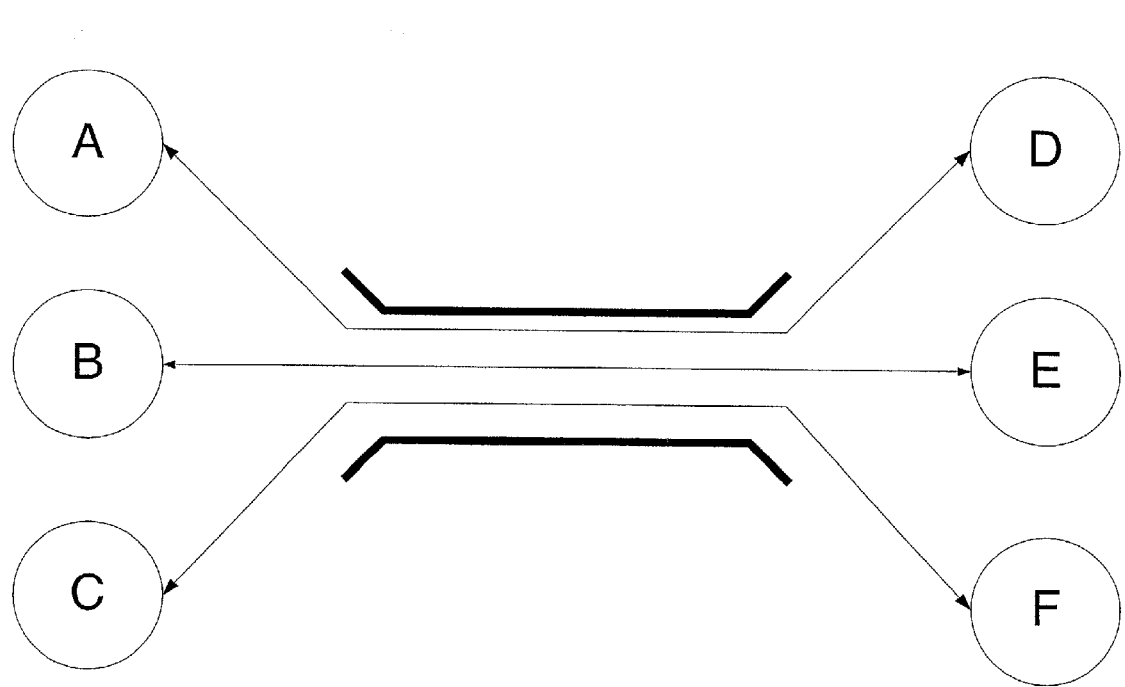
FIG. 3D illustrates an example of an SRLG having links that connect multiple node pairs.

FIG. 3D illustrates how an SRLG may consist of links that connect multiple node pairs and that do not even necessarily appear related based on an inspection of the network topology. Links connecting nodes A and D, B and E, and C and F are included within the same SRLG because they pass through the same fiber. There could also be multiple links between one or more of the depicted node pairs. In this case, the backup tunnels protecting the SRLG are the backup tunnels that protect each link in the SRLG and do not traverse any other link in the same SRLG.

In each situation, sufficient backup bandwidth should be placed between the appropriate node pair or pairs to protect the primary bandwidth associated with the protected element. In accordance with the methods disclosed in the patent application entitled "Load Balancing for Fast Reroute Tunnels," fast reroute protection may exploit multiple backup tunnels. Primary LSPs are divided among the backup tunnels in accordance with the backup requirements. This greatly enhances the ability to find sufficient bandwidth to address the situations of FIGS. 3A–3C.

Given the assumption of non-simultaneous failure, it will be seen that backup bandwidth consumed by the protection of one link or SRLG will be available for protecting other links or SRLGs. In protecting a node, backup bandwidth protecting one link pair through a node as in FIG. 3A should not be shared with other link pairs through the same node but should preferably shared with backup tunnels used in protecting other nodes, links or SRLGs. This may be done by signaling backup tunnels with zero bandwidth as is disclosed in the patent application entitled "Implied Shared Bandwidth for Fast Reroute Protection," or by using some off-line tool Placement of Backup Tunnels According to one embodiment of the present invention, the ability to divide backup bandwidth requirements among multiple backup tunnels is exploited to cast the problem of placing backup tunnels into a form amenable to the use of linear programming techniques. More specifically, by allowing backup bandwidth requirements to be split among multiple backup tunnels using the load-balancing techniques described in the patent application entitled "Load-Balancing for Fast Reroute Tunnels", the problem may be reduced to a linear program analogous to the well-known multi-commodity flow problem. This problem is no longer NP-complete and may be solved by standard linear programming techniques. Yet, unlike CSPF-based approaches, this method is guaranteed to find a placement of the backup tunnels if such placement exists.

Figure 4:
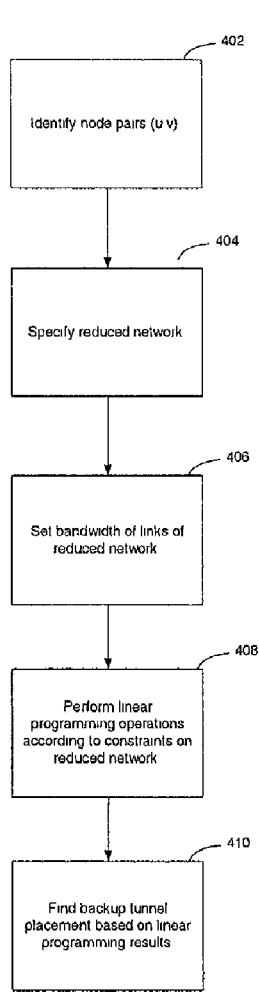
FIG. 4 is a flowchart describing steps of identifying backup tunnels according to one embodiment of the present invention.

FIG. 4 is a flowchart describing steps of identifying backup tunnels according to one embodiment of the present invention. The procedure of FIG. 4 is performed for a given element.

A step 402 identifies the set of pairs of nodes (u,v) that are directly adjacent to the protected element such that primary LSPs can traverse the protected element and both nodes u and v. For each such pair (u,v) step 402 identifies a (primary) flow B(u,v), i.e., the primary bandwidth associated with the flows traversing the protected element via nodes u and v as will now be explained.

When protecting a node N, the set of pairs (u,v) consists of all pairs of nodes directly adjacent to N. For node N in FIG. 3A, this set consists of directed pairs (A,B), (A,P), (A,O), (B,A), (B,P), (B,O), (P,A), (P,B), (P,O), (O,A), (O,B), (O,P). In this case B(A,B) is defined as the total amount of primary bandwidth that is used (or can be used) by all primary flows traversing all links AN and NB, where N is the protected node.

When protecting a directed link connecting some nodes A and B, the set of pairs (u,v) consists of a single pair (A,B). For example, in FIG. 3B, B(u,v) is simply the primary bandwidth of link AB. When protecting the bi-directional link between nodes A and B, the set (u,v) consists of two directed pairs (A,B) and (B,A). Note that in principle, B(u,v) and B(v,u) are not necessarily the same.

When protecting an SRLG, the set (u,v) consists of the set of directed pairs of endpoints of each link of this SRLG, and B(u,v) is defined as the sum of the primary bandwidths of all the links in this SRLG connecting the nodes u and v. For example, in FIG. 3C, an SRLG contains 3 parallel links connecting nodes A and B. In this case the set (u,v) consists of pairs (A,B), (B,A) and B(A,B) and B(B,A) are defined as the sum of primary bandwidth of all the three parallel links in the corresponding direction. In FIG. 3D, an SRLG consists of links AD, BE, CF, and the set (u,v) consists of the pairs (A,D), (B,E) and (C,F) and (D,A), (E,B) and (F,C). In this case B(A,D) is set to the primary bandwidth of link AD, B(B,E) is set to the primary bandwidth of link (BE) and B(CF) is set to the primary bandwidth of link CF, etc.

A step 404 defines a reduced network for further operations. That network is specified by a set of vertices and a set of directed links between these vertices. For bi-directional link protection, the nodes of the reduced network to be considered are all of the nodes of the original network and the links are all of the links of the original network except for the protected link. For SRLG protection, the nodes of the reduced network are all of the nodes of the original network and the links of the reduced network are all of the links except for the ones in the SRLG. For node protection, the reduced network nodes include all nodes except the protected node and the reduced network links include all links of the original network except the links directly adjacent to the protected node. A step 406 sets the "capacity" of each link in the remaining network to the backup bandwidth of that link in the original network.

The next step, step 408, solves the problem of finding a set of directed paths between all source-destination pairs (u,v) such that the total bandwidth on the set of paths connecting u to v in the network constructed in steps 402 through 406 is equal to B(u,v) and no link's capacity is exceeded.

Let JMAX denote the maximum number of parallel directed links connecting any two nodes. If node k is connected to node m via p<=JMAX parallel links, we index these links by j=1 . . . p. Let C(k,m,j) denote the capacity (backup pool capacity) of the j-th link connecting nodes k and m. We set C(k,m,j)=0 if there is no directed link connecting node k to m, or if there are fewer than j parallel links connecting node k to m. Let x(u,v,k,m,j) denote the amount of bandwidth of flow B(u,v) routed through link (k,m,j). The problem is to find the set of x(u,v,k,m,j) simultaneously satisfying the following set of constraints 1) Source and Destination Constraints:

The total bandwidth exiting u is the same as the total bandwidth entering v and also the same as the total flow B(u,v). More formally:

For any source u and any destination v, $$\sum_{m,j} x(u, v, u, m, j) = B(u, v)$$

$$\sum_{k,j} x(u, v, k, v, j) = B(u, v)$$

2) Capacity Constraints:

The capacity on any link should not be exceeded. Namely, for any link (k,m,j)

$$\sum_{u,v} x(u, v, k, m, j) \leq C(k, m, j)$$

3) Flow Conservation Constraints:

The total bandwidth entering a node should equal the bandwidth exiting the node. More specifically, for each node n and a pair of source u and destination v where n is distinct from u and v, $$\sum_{k,j} x(u, v, k, n, j) = \sum_{m,q} x(u, v, n, m, q)$$

4) Non-Negativity Constraints:

For all u,v,k,m,q, x(u,v,k,m,q)≥0

Standard linear programming techniques, e.g., the simplex method, may be applied by step 408 to find a set of variables (u,v,k,m,j) satisfying the four constraint groups. In principle the constraints may allow an infinite number of solutions. Any of those solutions would yield a feasible placement of the backup tunnels. A feasible solution satisfying the above set of constraints can result in cycles, i.e., backup tunnels that traverse the same node or nodes more than once. One way to eliminate the cycles is to introduce an optimality function $$F = \sum_{u,v,k,m,q} x(u, v, k, m, q)$$

Invoking linear programming techniques to find a feasible solution to the set of constraints 1 through 4 while minimizing function F will result in a feasible solution without cycles.

Step 408 runs the linear programming procedure to find a set of links x(u,v,k,m,j) that meets the constraints and is also optimal with respect to F. Note, however, that simply finding the variables $x(u,v,k,m,j)$ satisfying the capacity constraints and minimizing F does not yet yield the actual placement of the directed paths carrying the desired flows $B(u,v)$. Such placements are inferred from the set of $x(u,v,k,m,j)$ at a step 410. This can be done in any suitable way.

Figure 5:
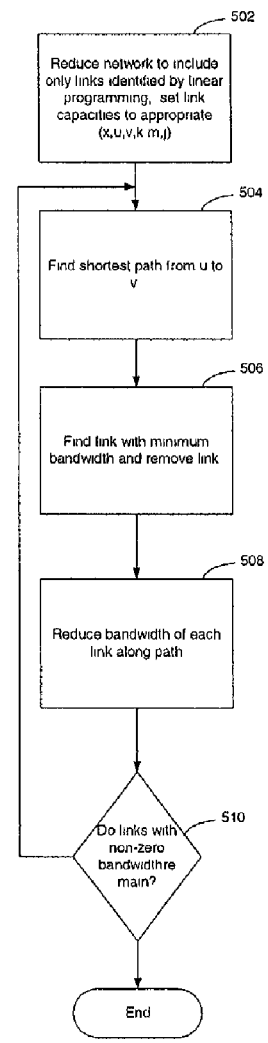
FIG. 5 is a flowchart describing steps of constructing backup tunnels from links identified by a linear programming procedure according to one embodiment of the present invention.

FIG. 5 is a flowchart describing steps of finding the backup tunnels based on the results of the linear programming procedure according to one embodiment of the present invention. The procedure is performed separately for each node pair $(u,v)$. At a step 502, the network is reduced to include only those links through which positive non-zero backup bandwidth has been allocated by the linear programming procedure. In other words, for each pair $(u,v)$ we consider the network consisting only of those links for which $x(u,v,k,m,j)>0$. For this step, for a given $(u,v)$, the capacity of each link $(k,m,j)$ in the reduced network is set to $x(u,v,k,m,j)$. The steps that follow relate to this reduced network.

A step 504 finds the shortest path from u to v. A step 506 then finds the link in this shortest path with the minimum bandwidth and further reduces the network by removing this link. Thus step 506 finds the min $x(u,v,x,y,z)$ along the path identified in step 504 and removes the link $(x,y,z)$. Step 508 then reduces the bandwidth on each of the remaining links of this path by the bandwidth of the removed link, i.e., each $x(u,v,k,m,j)$ on this path is reduced by $x(u,v,x,y,z)$. A step 510 then tests whether any links with non-zero bandwidth remain in the reduced network. If such links do remain, processing returns to step 504. If no links with non-zero bandwidth remain, the set of paths found at each repetition of step 504 are the backup tunnels for pair $(u,v)$ and each backup tunnel has the bandwidth identified at step 506.

The procedures of FIGS. 4–5 may be repeated for each element (node, SRLG or link) to find backup tunnels protecting the element. This procedure can be performed, e.g. off-line, by a dedicated server, etc., or by the nodes themselves if appropriate signaling mechanisms are implemented.

Once the backup tunnels are computed, there may be multiple backup tunnels with the same source and destination protecting the element. In that case load-balancing techniques described in the patent application entitled "Load Balancing for Fast Reroute Tunnels" can be used to assign primary LSPs to this set of backup tunnels.

The backup tunnels protecting the elements are preferably signaled with zero bandwidth to allow for sharing of backup bandwidth among nodes as described in the patent application "Implicit Shared Bandwidth Protection for Fast Reroute". By combining linear programming-driven placement of backup tunnels, load balancing of rerouted traffic among multiple backup tunnels, and sharing of backup bandwidth among protected nodes, one can provide highly bandwidth-efficient backup bandwidth protection with comparatively small computational requirements.

Network Device Details

Figure 1:
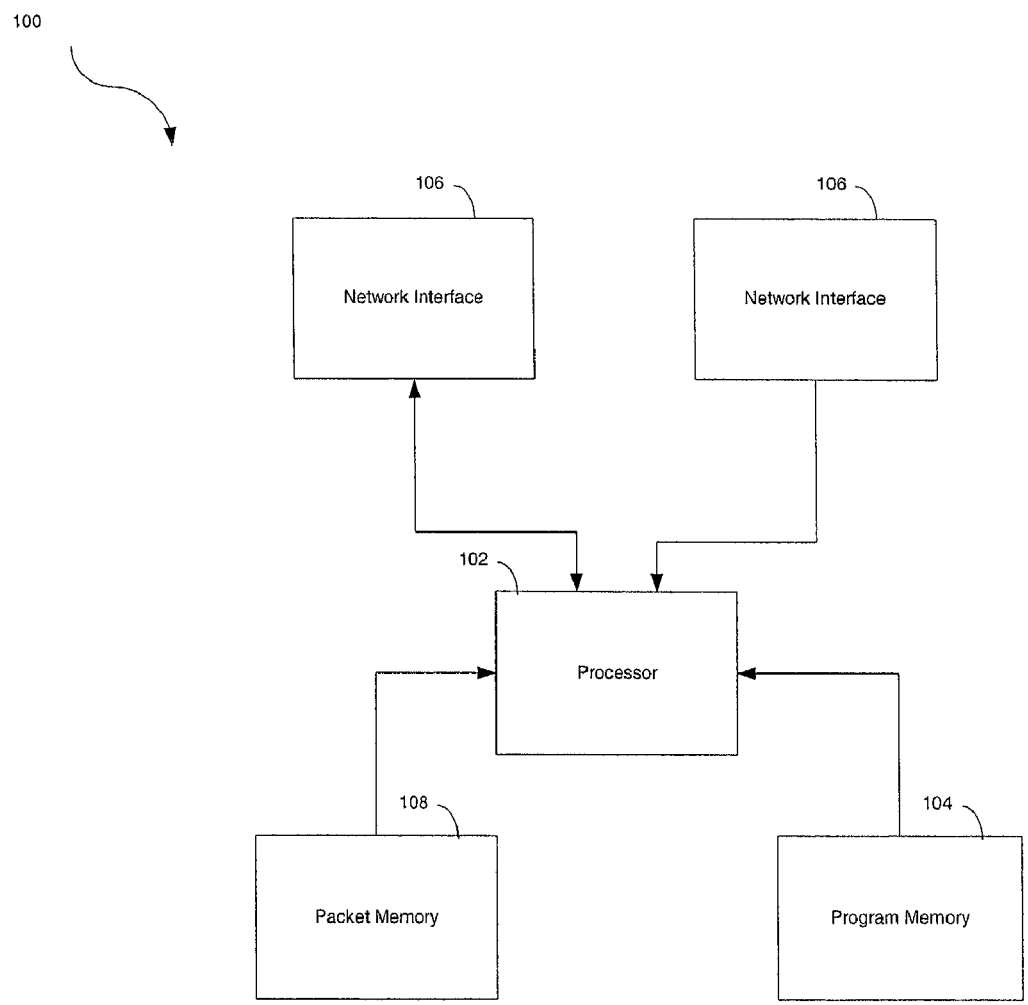
FIG. 1 depicts a network device according to one embodiment of the present invention.

FIG. 1 depicts a network device 100 that may be used to implement any of the described nodes or a network management workstation. In one embodiment, network device 100 is a programmable machine that may be implemented in hardware, software or any combination thereof. A processor 102 executes code stored in a program memory 104. Program memory 104 is one example of a computer-readable storage medium. Program memory 104 can be a volatile memory. Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 100 interfaces with physical media via a plurality of network interfaces 106. For example, one of network interfaces 106 may couple to an optical fiber and may incorporate appropriate physical and link layer functionality. Other examples of network interfaces include Ethernet interfaces, DSL interfaces, Gigabit Ethernet interfaces, 10-Gigabit Ethernet interfaces, etc. As packets are received, processed, and forwarded by network device 100, they may be stored in a packet memory 108. Network device 100 implements all of the network protocols and extensions thereof described above as well as the data networking features provided by the present invention.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method for placing fast reroute backup tunnels between nodes of one or more pairs of nodes of a network to satisfy a requested total bandwidth for fast reroute backup tunnels between nodes of each said pair, said method comprising:
    specifying a set of constraints on said backup tunnels;
    specifying an optimality function; and
    performing linear programming operations based on said set of constraints and said optimality function to find said backup tunnels, wherein performing linear programming operations based on said set of constraints and said optimality function includes minimizing said optimality function while satisfying said set of constraints and wherein the requested total bandwidth between nodes of each node pair may be divided among multiple backup tunnels.

2. The method of claim 1 wherein said set of constraints comprises:
    for each said node pair including a first node and a second node:
    a sum of backup tunnel bandwidths of backup tunnels exiting said first node should equal a requested total bandwidth of backup tunnels for said node pair;
    a sum of backup tunnel bandwidths of backup tunnels entering said second node should equal said requested total bandwidth of backup tunnels for said node pair.

3. The method of claim 2 wherein said set of constraints further comprises:
    for any link in said network, a sum of bandwidths consumed on the link by said backup tunnels does not exceed a backup bandwidth capacity of said link; and
    for each node in said network other than nodes of said node pairs, a sum of bandwidths of backup tunnels entering such node should equal a sum of bandwidths of backup tunnels exiting such node.

4. The method of claim 3 wherein
    said optimality function includes a sum of bandwidth used on all links of said network in meeting said requested total bandwidth of each said node pair.

5. The method of claim 1 wherein said linear programming operations are performed on a network that does not include a protected node and links connected to said protected node.

6. The method of claim 1 wherein said linear programming operations are performed on a network that does not include a protected link.

7. The method of claim 1 wherein performing linear programming operations comprises:
finding links employed in said backup tunnels using said set of constraints and a linear programming procedure; and
identifying backup tunnels made up of said links.

8. The method of claim 5 wherein identifying backup tunnels made up of said links comprises:
establishing a subnetwork consisting of only links found by said linear programming procedure;
identifying a shortest path between said first node and said second node through said subnetwork;
identifying a link in said shortest path having a smallest remaining bandwidth;
eliminating said link having said smallest remaining bandwidth from said subnetwork;
reducing available bandwidth of links of said shortest path by the bandwidth of said link having said smallest remaining bandwidth; and
repeating establishing, identifying said shortest path, identifying said link in said shortest path, eliminating, and reducing until no links remain in said subnetwork.

9. The method of claim 1 wherein said linear programming operations are performed on a network that includes a protected node and links connected to said protected node.

10. A computer-readable medium encoded for placing fast reroute backup tunnels between nodes of one or more pairs of nodes of a network to satisfy a requested total bandwidth for fast reroute backup tunnels between nodes of each said pair, said computer-readable medium comprising:
code that specifies a set of constraints on said backup tunnels;
code that specifies and optimality function; and
code that performs linear programming operations based on said set of constraints and said optimality function to find said backup tunnels, wherein said code that performs linear programming operations based on said set of constraints and said optimality function includes code that minimizes said optimality function while satisfying said set of constraints and wherein the requested total bandwidth between nodes of each node pair may be divided among multiple backup tunnels.

11. The computer-readable medium of claim 10 wherein said set of constraints comprises:
for each said node pair including a first node and a second node:
a sum of backup tunnel bandwidths of backup tunnels exiting said first node should equal a requested total bandwidth of backup tunnels for said node pair;
a sum of backup tunnel bandwidths of backup tunnels entering said second node should equal said requested total bandwidth of backup tunnels for said node pair.

12. The computer-readable medium of claim 11 wherein said set of constraints further comprises:
for any link in said network, a sum of bandwidths consumed on the link by said backup tunnels does not exceed a backup bandwidth capacity of said link; and
for each node in said network other than nodes of said node pairs, a sum of bandwidths of backup tunnels entering such node should equal a sum of bandwidths of backup tunnels exiting such node.

13. The computer-readable medium of claim 12 wherein:
said optimality function includes a sum of bandwidth used on all links of said network in meeting said requested total bandwidth of each said node pair.

14. The computer-readable medium of claim 10 wherein said linear programming operations are performed on a network that does not include a protected node and links connected to said protected node.

15. The computer-readable medium of claim 10 wherein said linear programming operations are performed on a network that does not include a protected link.

16. The computer-readable medium of claim 10 wherein said code that performs linear programming operations comprises:
code that finds links employed in said backup tunnels using said set of constraints and a linear programming procedure; and
code that identifies backup tunnels made up of said links.

17. The computer-readable medium of claim 16 wherein said code that identifies backup tunnels made up of said links comprises:
code that establishes a subnetwork consisting of only links found by said linear programming procedure;
code that identifies a shortest path between said first node and said second node through said subnetwork;
code that identifies a link in said shortest path having a smallest remaining bandwidth;
code that eliminates said link having said smallest remaining bandwidth from said subnetwork;
code that reduces available bandwidth of links of said shortest path by the bandwidth of said link having said smallest remaining bandwidth; and
code that repeatedly invokes said code that identifies said shortest path, said code that identifies said link in said shortest path, said code that eliminates, and said code that reduces until no links remain in said subnetwork.

18. Apparatus for placing fast reroute backup tunnels between nodes of one or more pairs of nodes of a network to satisfy a requested total bandwidth for fast reroute backup tunnels between nodes of each said pair, said apparatus comprising:
a processor; and
a memory device storing instructions executed by said processor, said instructions comprising:
code that specifies a set of constraints on said backup tunnels;
code that specifies an optimality function; and
code that performs linear programming operations based on said set of constraints and said optimality function to find said backup tunnels, wherein said code that performs linear programming operations based on said set of constraints and said optimality function includes code that minimizes said optimality function while satisfying said set of constraints and wherein the requested total bandwidth between nodes of each node pair may be divided among multiple backup tunnels.

19. The apparatus of claim 18 wherein said set of constraints comprises:
for each said node pair including a first node and a second node:
a sum of backup tunnel bandwidths of backup tunnels exiting said first node should equal a requested total bandwidth of backup tunnels for said node pair;
a sum of backup tunnel bandwidths of backup tunnels entering said second node should equal said requested total bandwidth of backup tunnels for said node pair.

20. The apparatus of claim 19 wherein said set of constraints further comprises:
for any link in said network, a sum of bandwidths consumed on the link by said backup tunnels does not exceed a backup bandwidth capacity of said link; and
for each node in said network other than nodes of said node pairs, a sum of bandwidths of backup tunnels entering such node should equal a sum of bandwidths of backup tunnels exiting such node.

21. The apparatus of claim 19 wherein:
said optimality function includes a sum of bandwidth used on all links of said network in meeting said requested total bandwidth of each said node pair.

22. The apparatus of claim 18 wherein said linear programming operations are performed on a network that does not include a protected node and links connected to said protected node.

23. The apparatus of claim 18 wherein said linear programming operations are performed on a network that does not include a protected link.

24. The apparatus of claim 18 wherein said code that performs linear programming operations comprises:
code that finds links employed in said backup tunnels using said set of constraints and a linear programming procedure; and
code that identifies backup tunnels made up of said links.

25. The apparatus of claim 18 wherein said code that identifies backup tunnels made up of said links comprises:
code that establishes a subnetwork consisting of only links found by said linear programming procedure;
code that identifies a shortest path between said first node and said second node through said subnetwork;
code that identifies a link in said shortest path having a smallest remaining bandwidth;
code that eliminates said link having said smallest remaining bandwidth from said subnetwork;
code that reduces available bandwidth of links of said shortest path by the bandwidth of said link having said smallest remaining bandwidth; and
code that repeatedly invokes said code that identifies said shortest path, said code that identifies said link in said shortest path, said code that eliminates, and said code that reduces until no links remain in said subnetwork.

26. Apparatus for placing fast reroute backup tunnels between nodes of one or more pairs of nodes of a network to satisfy a requested total bandwidth for fast reroute backup tunnels between nodes of each said pair, said apparatus comprising:
means for specifying a set of constraints on said backup tunnels;
means for specifying an optimality function; and
means for performing linear programming operations based on said set of constraints and said optimality function to find said backup tunnels, wherein said means for performing linear programming operations based on said set of constraints and said optimality function includes means for minimizing said optimality function while satisfying said set of constraints and wherein the requested total bandwidth between nodes of each node pair may be divided among multiple backup tunnels.

* * * * *